United States Patent
Cui

(10) Patent No.: US 12,325,334 B2
(45) Date of Patent: Jun. 10, 2025

(54) ADJUSTABLE MOUNT AND CHILD SAFETY SEAT

(71) Applicant: WONDERLAND SWITZERLAND AG, Steinhausen (CH)

(72) Inventor: Zongwang Cui, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 122 days.

(21) Appl. No.: 18/254,148

(22) PCT Filed: Dec. 15, 2021

(86) PCT No.: PCT/EP2021/085977
§ 371 (c)(1),
(2) Date: May 23, 2023

(87) PCT Pub. No.: WO2022/129217
PCT Pub. Date: Jun. 23, 2022

(65) Prior Publication Data
US 2024/0001821 A1    Jan. 4, 2024

(30) Foreign Application Priority Data
Dec. 15, 2020   (CN) ........................ 2020114801621.1

(51) Int. Cl.
*B60N 2/28*    (2006.01)
(52) U.S. Cl.
CPC ......... *B60N 2/2824* (2013.01); *B60N 2/2821* (2013.01); *B60N 2/2875* (2013.01); *B60N 2/2893* (2013.01)
(58) Field of Classification Search
CPC .. B60N 2/2887; B60N 2/2893; B60N 2/2821; B60N 2/2875; B60N 2/2824
(Continued)

(56) References Cited

U.S. PATENT DOCUMENTS

| | | | | |
|---|---|---|---|---|
| 5,507,564 A | * | 4/1996 | Huang | A47D 1/002 297/256.13 |
| 6,139,099 A | * | 10/2000 | Skold | B60N 2/2863 297/250.1 |

(Continued)

FOREIGN PATENT DOCUMENTS

| | | |
|---|---|---|
| CN | 103754137 A | 4/2014 |
| CN | 105722720 A | 6/2016 |

(Continued)

OTHER PUBLICATIONS

International Search Report issued in corresponding International Application No. PCT/EP2021/085977, dated Apr. 7, 2022, pp. 1-2, European Patent Office, Rijswijk, Netherlands.

(Continued)

*Primary Examiner* — Milton Nelson, Jr.
(74) *Attorney, Agent, or Firm* — HAUPTMAN HAM, LLP

(57) ABSTRACT

An adjustable mount and a child safety seat, wherein the adjustable mount includes: a top rod; a base including a base support, the top rod is pivotally connected to the base support through a top rod pivot shaft; and a top rod adjustment mechanism including an operating member, a positioning member, and an elastic member, the operating member and the positioning member are connected with each other so that the positioning member is movable in respect to the top rod through the operating member, the positioning member and the base support are positioned by a positioning mechanism, and the elastic member is arranged between the top rod and the positioning member.

16 Claims, 6 Drawing Sheets

(58) Field of Classification Search
USPC .................................................. 297/256.13
See application file for complete search history.

(56) References Cited

U.S. PATENT DOCUMENTS

| | | | |
|---|---|---|---|
| 9,452,695 B2* | 9/2016 | Sedlack | ............... B60N 2/2875 |
| 2005/0168023 A1 | 8/2005 | Gangadharan et al. | |
| 2008/0303321 A1 | 12/2008 | Powell | |
| 2014/0008951 A1 | 1/2014 | Spence et al. | |
| 2016/0200225 A1 | 7/2016 | Van Der Veer et al. | |
| 2018/0126877 A1 | 5/2018 | Williams | |
| 2019/0135141 A1 | 5/2019 | Bennett et al. | |

FOREIGN PATENT DOCUMENTS

| | | | | |
|---|---|---|---|---|
| CN | 106945576 A | 7/2017 | | |
| CN | 207274486 U | 4/2018 | | |
| CN | 111483362 A | 8/2020 | | |
| CN | 111770854 A | 10/2020 | | |
| DE | 202014104603 U1 | 11/2014 | | |
| DE | 102016116502 B4 | 9/2019 | | |
| EP | 1369294 A1 | 12/2003 | | |
| EP | 1369295 A1 | 12/2003 | | |
| EP | 1695864 A1 * | 8/2006 | ........... | B60N 2/2806 |
| EP | 3689671 A1 | 8/2020 | | |
| TW | 1574863 B | 3/2017 | | |

OTHER PUBLICATIONS

Taiwan Office Action issued in corresponding Taiwan Application No. 110146713, dated Oct. 6, 2022, pp. 1-4.
Chinese 1st Office Action issued in corresponding Chinese Application No. 202011480162.1, dated Mar. 12, 2024, pp. 1-14.
First Office Action issuend in European Patent Application No. 21839162.1, mailed Sep. 5, 2024, 6 pgs.
Notice of Allowance issued Chinese Patent Application No. 2020114801621, mailed Jul. 22, 2024, 4 pgs.

* cited by examiner

ADJUSTABLE MOUNT AND CHILD SAFETY SEAT

CROSS-REFERENCE TO RELATED APPLICATIONS

This application is a National Stage Application of PCT/EP2021/085977, filed on Dec. 15, 2021, which claims benefit of Chinese Application No. 2020114801621, filed on Dec. 15, 2020, both of which are incorporated herein by reference in its entirety.

TECHNICAL FIELD

The application relates to an adjustable mount and a child safety seat including the adjustable mount.

BACKGROUND

Child safety seat is a device specially designed for children. A child will be bound in the safety seat during seating, so that in the case of a car collision or sudden deceleration, the impact on the child can be reduced and the child's body can be restricted, thereby reducing the harm and effectively improving the safety of the child in seating.

SUMMARY

In view of the above, an object of at least one embodiment of the application is to provide an adjustable mount and a child safety seat including the adjustable mount, the distance between the top rod and the tailstock can be adjusted in a simple and effective manner, thereby facilitating the adjustment of fitting degree between the child safety seat and the car seat back to increase safety and reliability.

For this, according to a solution of at least one embodiment of the application, an adjustable mount is provided. The adjustable mount includes: a top rod; a base including a base support, the top rod is pivotally connected to the base support through a top rod pivot shaft; and a top rod adjustment mechanism including an operating member, a positioning member, and an elastic member, the operating member and the positioning member are connected with each other so that the positioning member is movable in respect to the top rod through the operating member, the positioning member and the base support are positioned by a positioning mechanism, and the elastic member is arranged between the top rod and the positioning member.

In at least one embodiment, the adjustable mount further includes a tailstock, and the tailstock is integrally formed with the base.

In at least one embodiment, the positioning mechanism includes a plurality of grooves disposed on the base support and a plurality of protrusions disposed on the positioning member, or the positioning mechanism comprises a plurality of protrusions disposed on the base support and a plurality of grooves disposed on the positioning member.

In at least one embodiment, the positioning mechanism includes first positioning teeth disposed on the base support and second positioning teeth disposed on the positioning member.

In at least one embodiment, the positioning member includes an engaging part and two fixed stands, the two fixed stands are symmetrically clasped and fixed on the top rod, the engaging part is slidably disposed between the two fixed stands, and the plurality of protrusions or the plurality of grooves are disposed on the engaging part.

In at least one embodiment, the positioning member includes an engaging part and two fixed stands, the two fixed stands are symmetrically clasped and fixed on the top rod, the engaging part is slidably disposed between the two fixed stands, and the second positioning teeth are disposed on the engaging part.

In at least one embodiment, a slot is disposed on one of the fixed stands to accommodate the elastic member, a window is disposed in the engaging part at a position corresponding to the slot, and the elastic member accommodated in the slot is partly exposed from the window.

In at least one embodiment, two said top rod adjustment mechanisms are disposed corresponding to the base support of the base.

In at least one embodiment, the adjustable mount further includes a pulling handle, and the pulling handle is connected to the operating member of each of the two top rod adjustment mechanisms.

In at least one embodiment, the operating member is formed with an operating member hole, the positioning member and the top rod are accommodated in the operating member hole, and the positioning member is movable in respect to the top rod through the operating member.

In at least one embodiment, the positioning member is slidable along the top rod to be released from lock through the operating member, or the positioning member is slidable away from the top rod in a direction perpendicular to the paper surface to be released from lock through the operating member.

According to another solution of at least one embodiment of the application, a child safety seat installed in the adjustable mount as described above is provided, the adjustable mount further comprises a tailstock, the child safety seat has a seat part disposed in a space surrounded by the top rod, the tailstock, and the base, and is fit between the top rod and the tailstock.

The adjustable mount according to at least one embodiment of the application is simple in structure and convenient in operation, has a low cost, and can adjust the distance between the top rod and the tailstock in a simple and effective manner, thereby facilitating the adjustment of fitting degree between the child safety seat and the car seat back to increase safety and reliability. In addition, the child safety seat according to at least one embodiment of the application is more convenient in storage and installation.

BRIEF DESCRIPTION OF THE DRAWINGS

Those skilled in the art will understand that the drawings are mainly used for illustrative purposes and are not intended to limit the scope of the subject matter described herein. The drawings are not necessarily drawn to scale. In some cases, various aspects of the subject matter disclosed herein may be exaggerated or enlarged in the drawings to facilitate understanding of different features. In the drawings, the same reference numerals generally refer to the same features (for example, functionally similar and/or structurally similar elements).

In the drawings.

DETAILED DESCRIPTION

Figure 1:
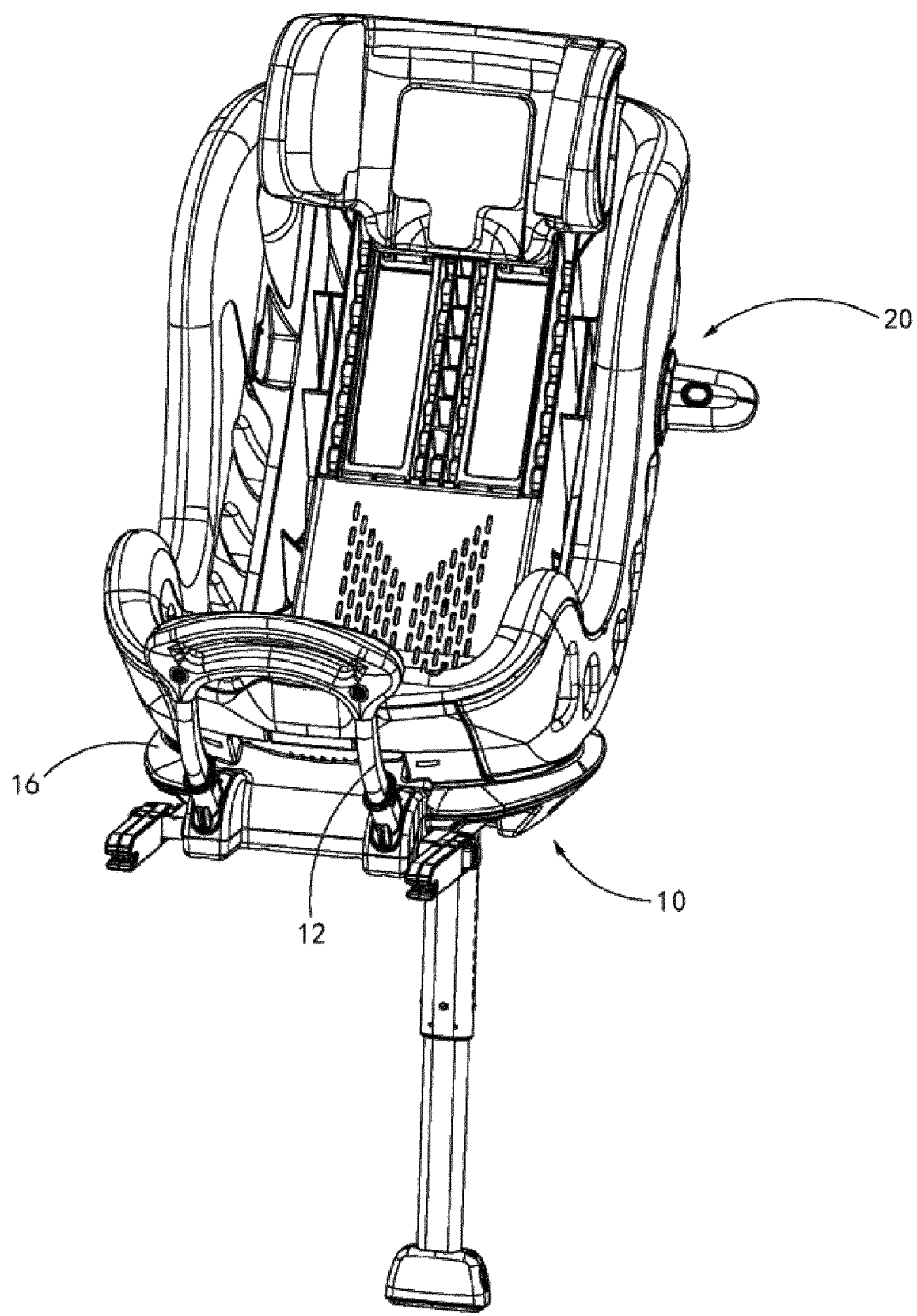
FIG. 1 is a schematic view of an adjustable mount installed on a child safety seat according to the application.

The drawings and example embodiments described below are not meant to limit the scope of the disclosure to a single embodiment. Instead, the embodiments can be realized by replacing part or all of the described or illustrated elements. In addition, in the case where certain elements of the disclosed example embodiment may be partially or wholly implemented using known components, only some parts of such known components necessary for understanding the disclosure are described in some cases, and detailed description of other parts of these known components are omitted so as not to obscure the disclosure.

In order to further effectively improve the safety of the child safety seat and prevent the child safety seat from overturning, it is necessary to adjust the fitting degree between the child safety seat and the back of the car seat. An ISOFIX interface is an international standard (ISO 13216) for attachment points for child safety seats in cars. In the related art, such adjustment is often indirectly performed by adjusting the length of the ISOFIX. However, the adjustment range of this kind is very limited and cannot meet the requirements in practical use.

In addition, e.g., a child safety seat and its adjustment mechanism has been proposed, which includes top rod engaging block, a locking member, and a driving member. The top rod engaging block is slidably disposed on a base along a first direction and detachably engaged with the top rod. The locking member is slidably disposed on the base along a second direction and detachably engaged with the top rod engaging block. The driving member is slidably disposed on the base along the second direction and connected to the top rod engaging block. When the locking member is separated from the top rod engaging block, the driving member may drive the top rod engaging block to slide along the first direction for separating from the top rod, thereby adjusting an angle of the top rod. Accordingly, the top rod and the backrest of the car seat may cooperate with each other better, and the space for accommodating the legs of the infant or child may be adjusted so that the infant or child may seat more comfortably.

In the above-mentioned child safety seat, although the angle of the top rod can be adjusted, the following problems still need to be solved. Firstly, the adjustment mechanism is complicated, which involves components connected cooperatively and acted cooperatively in at least two directions, so it is difficult to be manufactured and assembled, and the cost is high. Furthermore, the adjustment operation is complicated, and cooperation among multiple components and operations in multiple directions are required, so operation failures are prone to occur, and there are potential risks in safety and reliability.

Therefore, there is a problem in the related art in the adjustment of the fitting degree between the child safety seat and the car seatback in an efficient and simple manner.

In the following detailed description, an adjustable mount 10 according to the application used to a child safety seat 20 is taken as an example, the adjustable mount 10 can also be used for other occasions.

A detailed illustration will be given hereinbelow with reference to the drawings.

As shown in FIG. 1, which is a schematic view of an adjustable mount 10 installed on a child safety seat 20 according to an embodiment of the application, the child safety seat 20 may be installed on a car seat forwardly or backwardly. The child safety seat 20 will be illustrated as being installed on the car seat backwardly, that is, the occupant of the child safety seat faces the rear of the car.

The child safety seat 20 is arranged on a base 16 of the adjustable mount 10, and the child safety seat 20 is fixed, e.g., fixed through an ISOFIX interface and/or LATCH interface, and connected to the car seat by using the adjustable mount 10. In order to improve the safety of the child safety seat 20 and prevent the child safety seat 20 from overturning, the child safety seat 20 may be closely fit to a back of the car seat through the adjustable mount 10. For this, as shown in FIG. 1, a top rod 12 of the adjustable mount 10 is abutted against the child safety seat 20, the degree with which the child safety seat 20 fits with the car seat back may be changed by adjusting an angle of the top rod 12.

Figure 2:
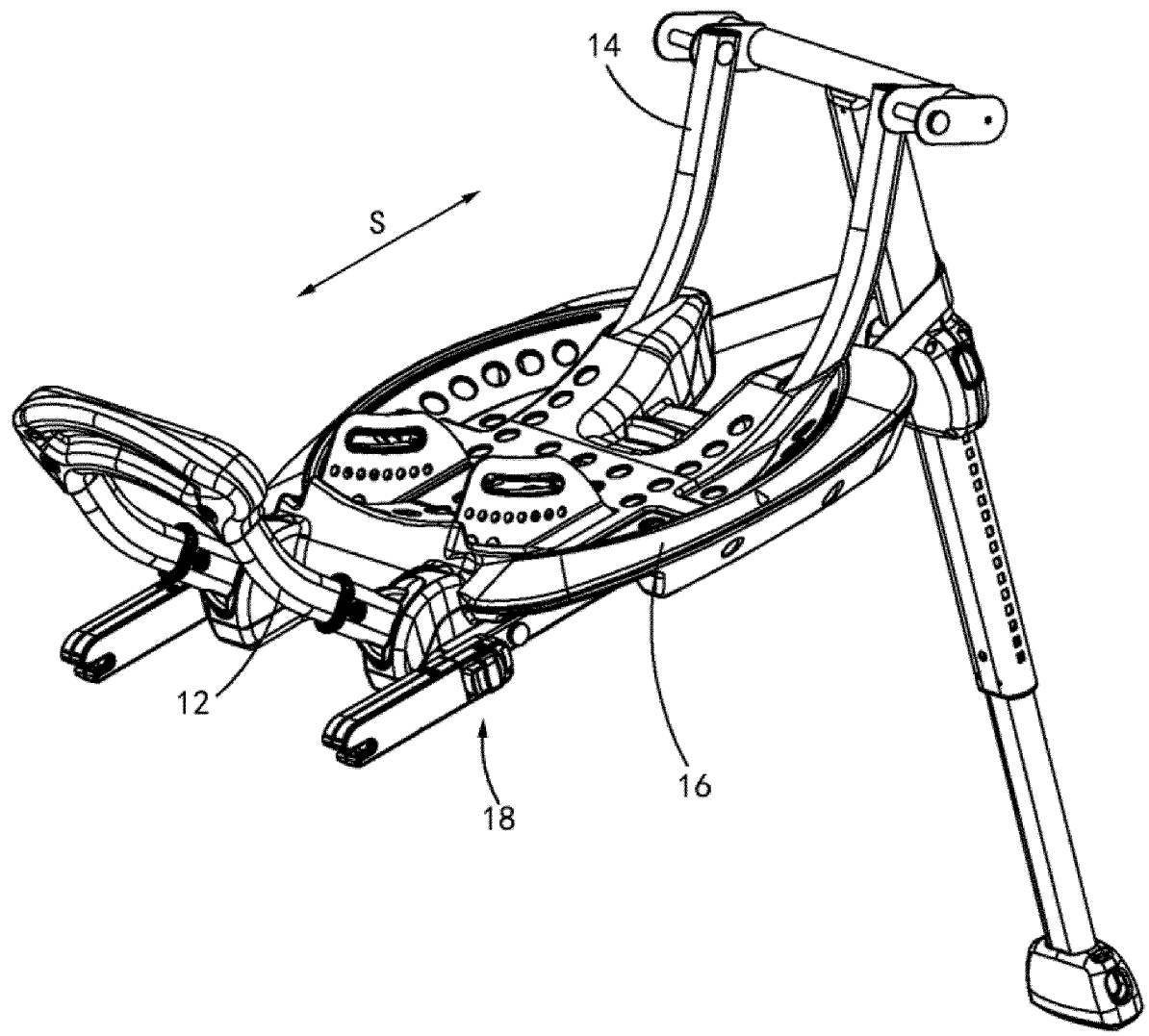
FIG. 2 is a structural schematic view of the adjustable mount according to the application.

For details, please refer to FIG. 2, which is a structural schematic view of the adjustable mount 10 according to an embodiment of the application. The adjustable mount 10 includes the top rod 12 described above, a tailstock 14, the base 16, and a top rod adjustment mechanism 18. The top rod 12 and the tailstock 14 are arranged opposite each other, and both extend upwardly from the base 16, so a space is formed by the top rod 12, the tailstock 14, and the base 16. Moreover, the child safety seat 20 is accommodated in the space. In at least one embodiment, the tailstock 14 and the base 16 may be integrally formed. An angle of the top rod 12 in respect to the base 16 may be adjusted by the top rod adjustment mechanism 18, and a distance S between the top rod 12 and the tailstock 14 may be adjusted.

Figure 3:
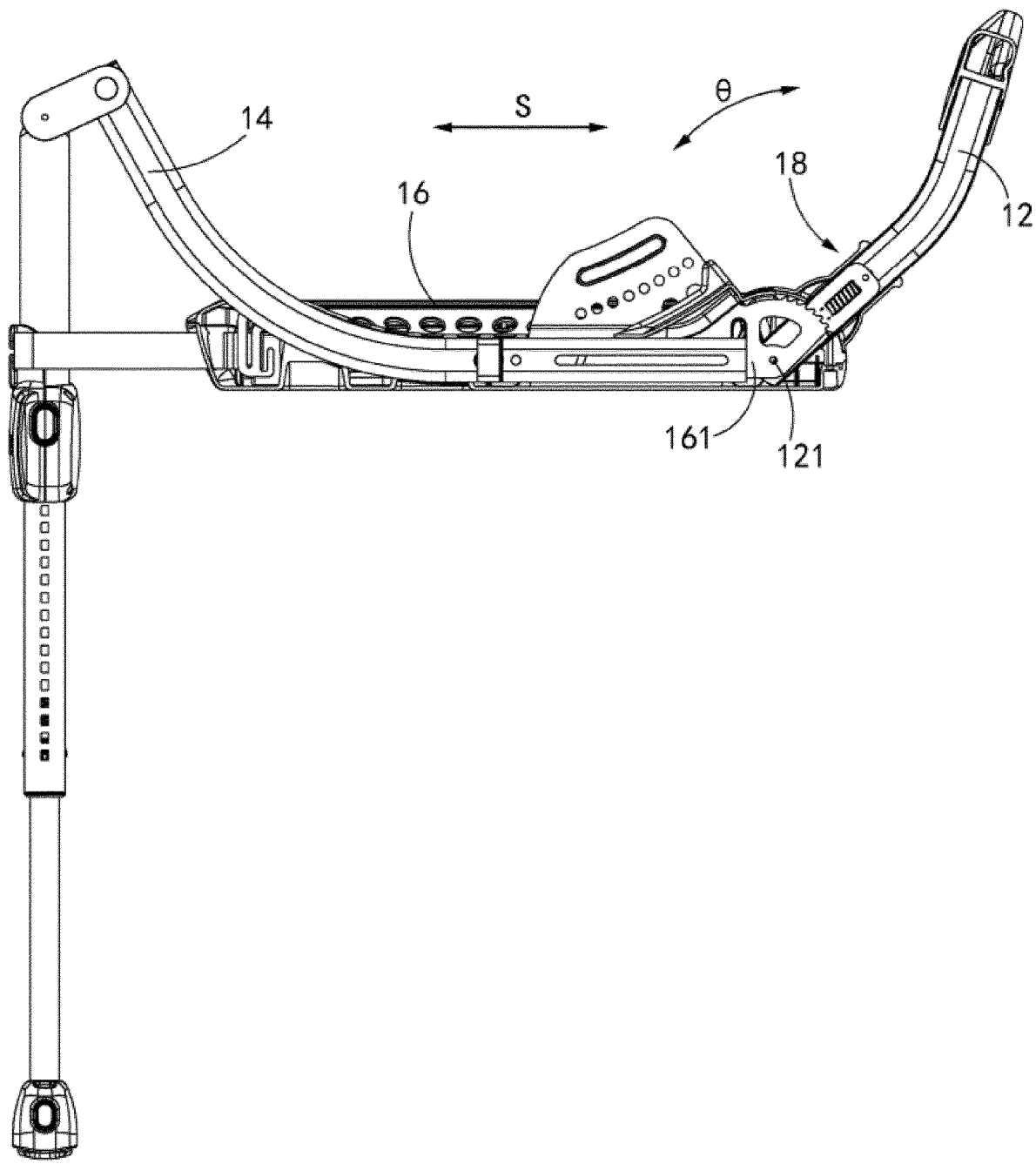
FIG. 3 is a structural schematic view of a top rod adjustment mechanism of the adjustable mount according to the application.
Figure 4:
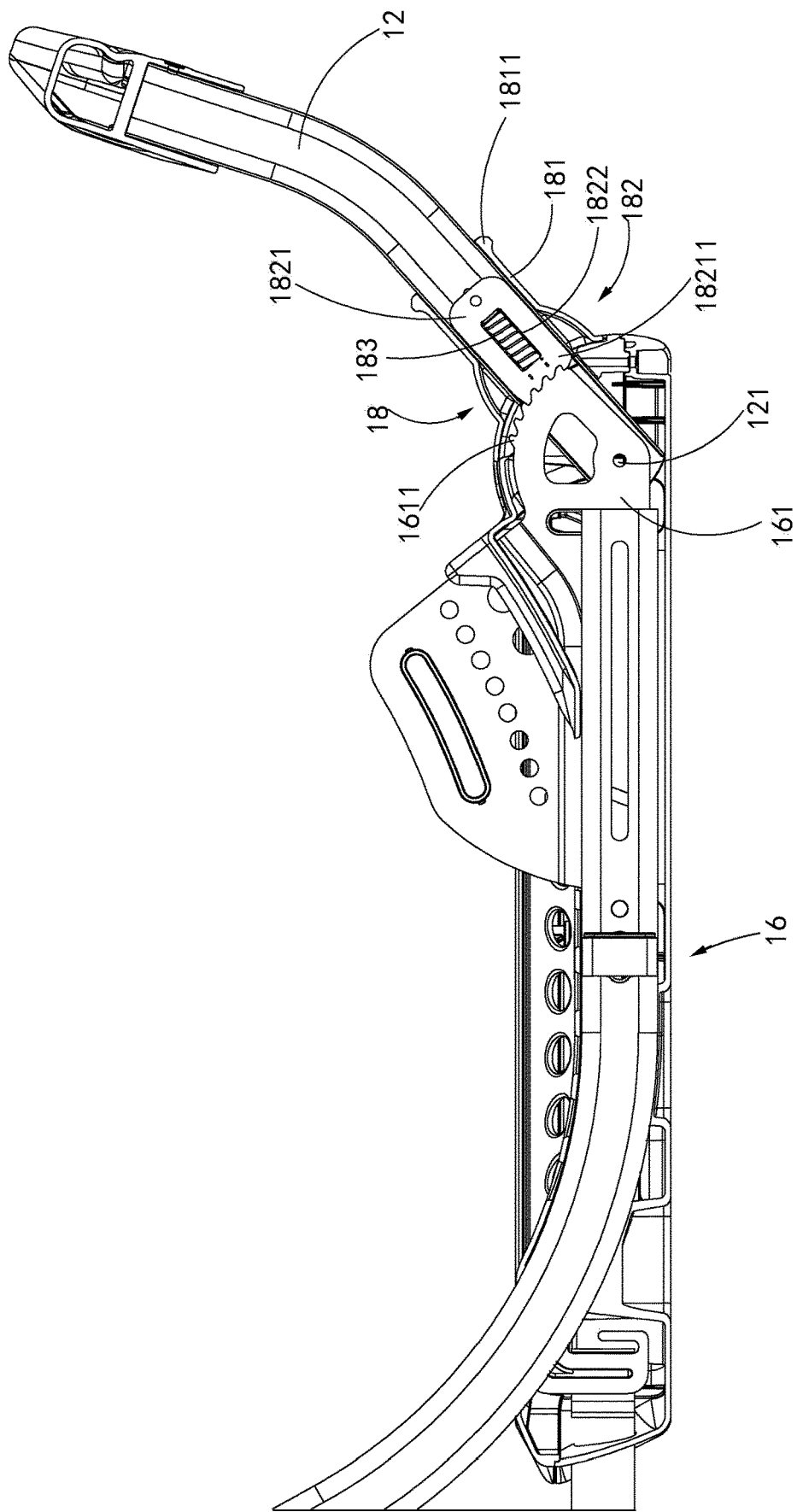
FIG. 4 is a schematic view showing the structure of the top rod adjustment mechanism of the adjustable mount according to the application in detail.

The structure of the top rod adjustment mechanism 18 will be described in detail hereinbelow with reference to FIGS. 3 and 4, where FIG. 3 is a structural schematic view of the top rod adjustment mechanism 18 of the adjustable mount 10 according to an embodiment of the application, and FIG. 4 is a schematic view showing the structure of the top rod adjustment mechanism 18 of the adjustable mount 10 according to an embodiment of the application in detail. A base support 161 is disposed on the base 16, and the top rod 12 is pivotally connected to the base support 161 through a top rod pivot shaft 121, so that the included angle θ between the top rod 12 and the base support 161 may be adjusted by the top rod 12 pivoting around the top rod pivot shaft 121, and in turn the distance S between the top rod 12 and the tailstock 14 may be adjusted.

The pivot angle of the top rod 12 according to the application is 22°, and the adjustment range of the included angle θ between the top rod 12 and the base support 161 is 119°-141°. In this way, the top rod 12 may closely fit to the car seat back behind it, so as to avoid the child safety seat 20 from overturning toward the car seat back, and thereby improving the safety of the child safety seat 20. Furthermore, the pivot angle of the top rod 12 is 22°, and the various angles make the child safety seat 20 more diversified in receiving space and installation, so the child safety seat 20 is more convenient in terms of receiving and installation.

The adjustment of the included angle θ between the top rod 12 and the base support 161 is performed by the top rod adjustment mechanism 18. The top rod adjustment mechanism 18 is disposed between the top rod 12 and the base support 161, one end of the top rod adjustment mechanism 18 may be, e.g., engaged and locked to the base support 161 and unlocked from the base support 161, and the other end of the top rod adjustment mechanism 18 may be fixed and connected to the top rod 12, so the top rod adjustment mechanism 18 may be used to adjust the included angle θ between the top rod 12 and the base support 161.

Specifically, the top rod adjustment mechanism 18 includes an operating member 181, a positioning member 182, and an elastic member 183. In addition to the pivotal connection between the top rod 12 and the base support 161, the positioning member 182 and the base support 161 are also engaged and positioned with each other by a positioning mechanism, and may be positioned again at multiple different positions after the top rod 12 is rotated at different angles with respect to the base support 161. According to an embodiment of the application, as shown in FIGS. 3 and 4, the positioning mechanism includes first positioning teeth 1611 disposed on the base support 161 and second positioning teeth 18211 disposed on the positioning member 182. The second positioning teeth 18211 may be engaged with the first positioning teeth 1611, so as to lock the included angle θ between the top rod 12 and the base support 161. The first positioning teeth 1611 and the second positioning teeth 18211 are respectively arranged on the opposite end faces of the base support 161 and the positioning member 182, thusly, after the top rod 12 is pivoted a certain angle with respect to the base support 161, the first positioning teeth 1611 and the second positioning teeth 18211 can still be engaged with each other, so that the top rod 12 can still be positioned and engaged with the base support 161 after the included angle θ between the top rod 12 and the base support 161 is changed.

According to another embodiment of the application, the positioning mechanism is composed of a plurality of grooves disposed on the base support 161 and a plurality of protrusions disposed on the positioning member 182. The top rod 12 and the base support 161 are positioned by engagement of a groove(s) and a corresponding protrusion (s). After the top rod 12 is pivoted a certain angle with respect to the base support 161, the other groove(s) and the other corresponding protrusion(s) can still be engaged with each other, such that the top rod 12 can still be positioned with respect to the base support 161 after its included angle with the base support 161 is changed. Of course, the positioning mechanism may also be composed of a plurality of protrusions disposed on the base support 161 and a plurality of grooves disposed on the positioning member 182. Moreover, number and spacing of the grooves and the corresponding protrusions can be set according to the range of the pivot angle of the top rod 12 with respect to the base support 161 and the setting of the angle of each rotation.

If engagement of the first positioning teeth 1611 and the second positioning teeth 18211 as mentioned above is used to position the top rod 12 and the base support 161, then after the positioning is removed, the top rod 12 can be engaged and positioned again after being rotated by any angle within a certain range with respect to the base support 161. Moreover, if engagement of the grooves and protrusions is used to position the top rod 12 and the base support 161, after the positioning is removed, the top rod 12 is required to be pivoted an angle with respect to the base support 161, and the angle is set based on the distance between the cooperating protrusions or grooves, that is, the top rod 12 can only be engaged and positioned again after being pivoted a certain angle. Therefore, various positioning mechanisms can be selected according to specific practical requirements.

Figure 5:
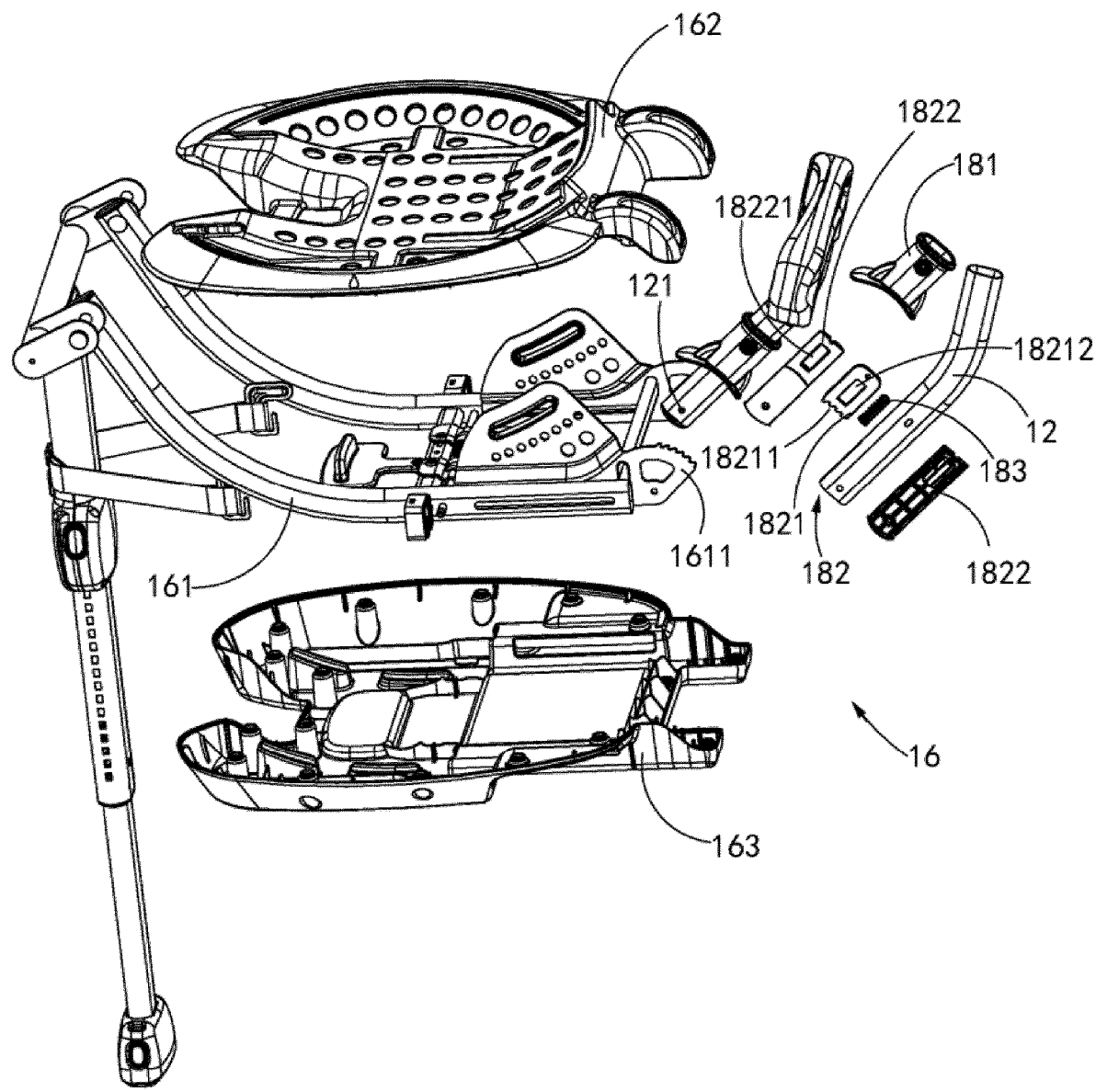
FIG. 5 is an exploded schematic view showing the structure of a base and the top rod adjustment mechanism according to the application in detail.

The specific structure of each component of the top rod adjustment mechanism 18 and the specific cooperation relationship between the top rod adjustment mechanism 18 and the base 16 will be described in detail below with reference to FIG. 5. FIG. 5 is an exploded schematic view of showing the structure of the base 16 and the top rod adjustment mechanism 18 according to an embodiment of the application in detail. The operating member 181 may be in the form of a sleeve, and the top rod 12 is pivotally connected to the base support 161 by the top rod pivot shaft 121 after passing through the operating member 181. The positioning member 182 includes an engaging part 1821 and a fixed stand 1822. In the embodiment shown in FIG. 5, the positioning member 182 includes two fixed stands 1822. The two fixed stands 1822 are symmetrically clasped and fixed on the top rod 12, and the engaging part 1821 is slidably disposed between the two fixed stands 1822. The engaging part 1821 can be engaged and positioned with the base support 161, and can also be disengaged from engaging with the base support 161. The end of the engaging part 1821 engaged with the base support 161 is provided with the second positioning teeth 18211 as mentioned above, and the second positioning teeth 18211 cooperate with the first positioning teeth 1611 on the base support 161. The operating member 181 is sleeved on an outer circumference of the top rod 12 and covers at least part of the top rod 12 and the two fixed stands 1822, and in the meanwhile, the operating member 181 is connected to the engaging part 1821, such that the engaging part 1821 can be pulled by pulling the operating member 181, thereby disengaging the second positioning teeth 18211 of the engaging part 1821 from cooperation with the first positioning teeth 1611 of the base support 161.

An elastic member 183 is disposed between the positioning member 182 and the top rod 12, and for example, a slot 18221 is disposed on one of the fixed stands 1822 to accommodate the elastic member 183, meanwhile, a window 18212 is disposed in the engaging part 1821 at a corresponding position. The elastic member 183 is accommodated in the slot 18221 and is exposed partly from the window 18212. In such case, when the engaging part 1821 slides outwardly along the top rod 12 in a direction away from the base support 161, an edge portion of the window 18212 of the engaging part 1821 compresses the elastic member 183 accommodated in the slot 18221. In this way, when the operating member 181 is released, the compressed elastic member 183 provides a restoring force to pull the engaging part 1821 to move toward the base support 161, such that the second positioning teeth 18211 is engaged with the first positioning teeth 1611 and positioned accordingly, thereby making the top rod 12 be engaged and positioned in respect to the base support 161.

In the top rod adjustment mechanism 18, the operating member 181 and the engaging part 1821 are connected with each other, thusly the engaging part 1821 can be operated by pulling the operating member 181, such that the engaging part 1821 can slide along the top rod 12. In an embodiment according to the application, as shown in FIG. 4, the operating member 181 is provided with an operating member hole 1811. The positioning member 182, together with the top rod 12 passing therethrough, is accommodated in the operating member hole 1811, and the operating member 181 and the engaging part 1821 are connected with each other by, e.g., a pin or the like. According to this embodiment, when the operating member 181 is pulled along the top rod 12 in an outward direction away from the base support 161, the operating member 181 is linked with the engaging part 1821 to slide along the top rod 12 in the direction away from the base support 161, the elastic member 183 is compressed at the same time, the second positioning teeth 18211 on the engaging part 1821 are disengaged from the engagement with the first positioning teeth 1611 on the base support 161. At this time, the top rod 12 may be pivoted with respect to the base support 161. After the pivot angle is adjusted, the operating member 181 is released, and the compressed elastic member 183 provides a restoring force to push the positioning member 182 to slide in a direction toward the base support 161, in turn, the second positioning teeth 18211 on the engaging part 1821 and the first positioning teeth 1611 on the base support 161 are engaged with each other again, so as to lock the top rod 12 and the base support 161.

According to another embodiment of the application, the positioning member 182 may also be arranged to move in a direction perpendicular to the paper surface as shown in the figure, so as to be released from lock. At this time, the elastic member 183 is required to be arranged between the positioning member 182 and the top rod 12 along a direction in which the positioning member 182 moves, and the operating member 181 may be arranged on a side of the top rod 12. According to this embodiment, the operating member 181 is directly pressed, and the operating member 181 pushes the positioning member 182 to disengage it from the engagement with the base support 161, so as to release the lock. After the adjustment is performed, the operating member 181 is released, and under the action of the restoring force of the elastic member 183, the positioning member 182 locks the top rod 12 and the base support 161 again.

Figure 6:
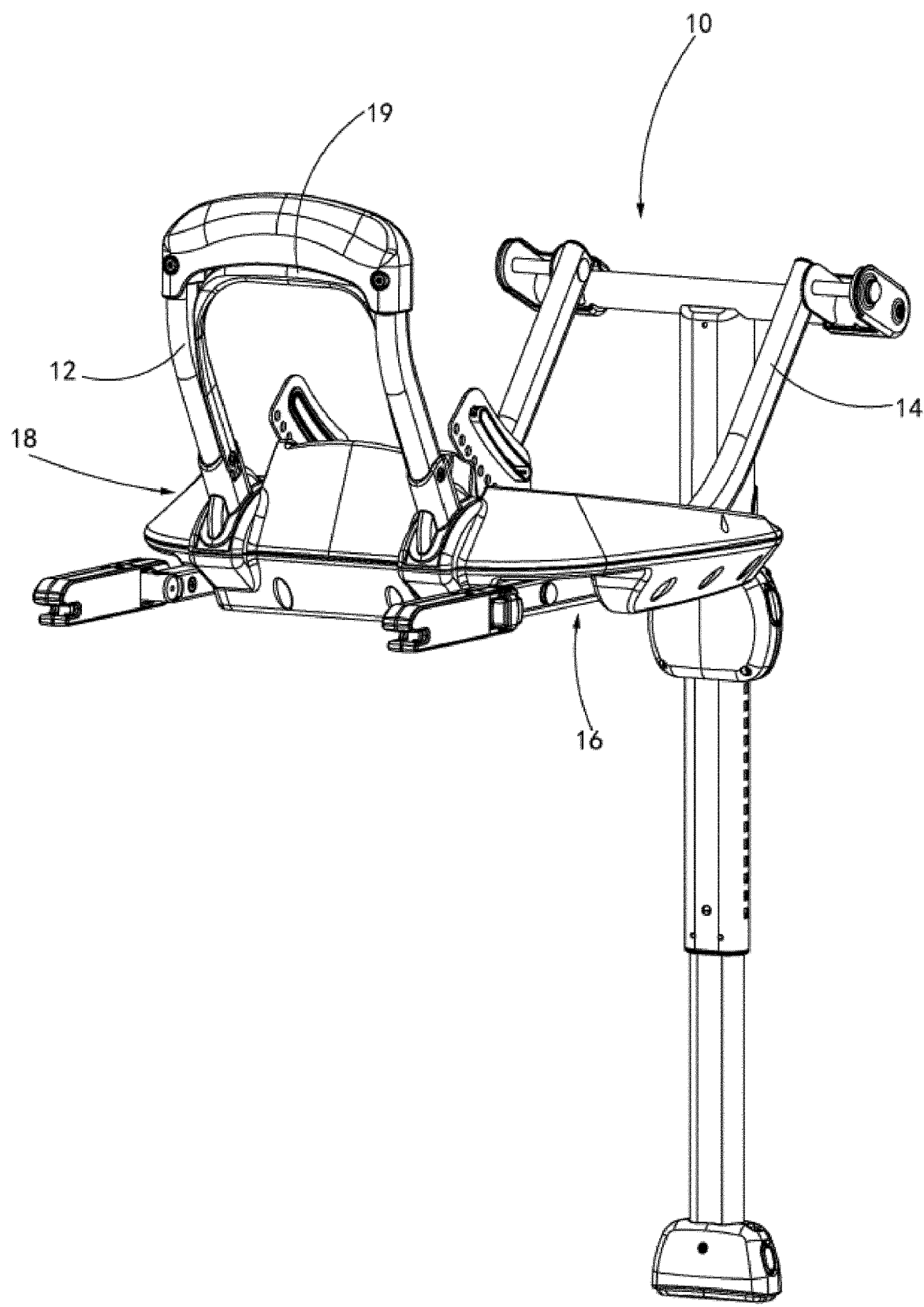
FIG. 6 is a structural schematic view of the adjustable mount according to another embodiment of the application.

In the above embodiment according to the application, as shown in FIGS. 1, 2, and 5, two top rod adjustment mechanisms 18 corresponding to the base support 161 of the base 16 are provided, and each of the two top rod adjustment mechanisms 18 has a specific structure as described above. Therefore, when it is necessary to adjust the included angle θ between the top rod 12 and the base support 161, it is necessary to simultaneously pull the two operating members 181. According to another embodiment of the application, as shown in FIG. 6, which is a structural schematic view of the adjustable mount 10 according to another embodiment of the application, the adjustable mount 10 is further provided with a pulling handle 19. The pulling handle 19 is connected to both of the two operating members 181, so when it is necessary to adjust the included angle θ between the top rod 12 and the base support 161, the pulling handle 19 may be directly pulled to link the operating members 181 to move, such that the engaging part 1821 of the positioning member 182 slides out of the engaged and locked position, thereby enabling an adjustment operation to be completed by using the pulling handle 19 with one hand.

The top rod adjustment mechanism 18 according to an embodiment of the application can conveniently and effectively adjust the distance S between the top rod 12 and the tailstock 14 by conveniently and effectively adjusting the pivot angle of the top rod 12 with respect to the base support 161, and the top rod adjustment mechanism 18 can further adjust the fitting degree between the child safety seat and the car seat back, to increase safety and reliability. Furthermore, the top rod adjustment mechanism 18 according to an embodiment of the application has a simple structure, low cost, and simple assembly operation. In addition, the child safety seat 20 according to an embodiment is more convenient in storage and installation.

The description provided herein illustrates the various features with the aid of its preferred and exemplary embodiments. Those of ordinary skill in the art can make many other embodiments, modifications and variations within the scope and spirit of the appended claims by reading this specification.

LIST OF REFERENCE SIGNS

10: adjustable mount
  12 top rod
  121 top rod pivot shaft
  14 tail stock
  16 base
  161 base support
    1611 first positioning teeth
  162 cover body
  163 base body
  18 top rod adjustment mechanism
  181 operating member
    1811 operating member hole
  182 positioning member
    1821 engaging paIt
      18211 second positioning teeth 18212 window
    1822 fixed stand
      18221 slot
  83 elastic member
  19 pulling handle
20: child safety seat

What is claimed is:

1. An adjustable mount comprising:
   a top rod;
   a base including a base support, wherein the top rod is pivotally connected to the base support through a top rod pivot shaft; and
   a top rod adjustment mechanism including an operating member, a positioning member, and an elastic member, wherein the operating member and the positioning member are connected with each other so that the positioning member is movable in respect to the top rod through the operating member, wherein the positioning member and the base support are positioned by a positioning mechanism, and the elastic member is arranged between the top rod and the positioning member,
   the operating member is in a form of a sleeve, and the top rod is pivotally connected to the base support by the top rod pivot shaft after passing through the operating member,
   the positioning mechanism includes first positioning teeth disposed on the base support and second positioning teeth disposed on the positioning member, and
   when the operating member is pulled along the top rod in an outward direction away from the base support, the second positioning teeth on the positioning member are disengaged from an engagement with the first positioning teeth on the base support.

2. The adjustable mount according to claim 1, wherein the adjustable mount further comprises a tailstock, and the tailstock is integrally formed with the base.

3. The adjustable mount according to claim 2, wherein the positioning mechanism includes a plurality of grooves disposed on the base support and a plurality of protrusions disposed on the positioning member, or the positioning mechanism includes a plurality of protrusions disposed on the base support and a plurality of grooves disposed on the positioning member.

4. The adjustable mount according to claim 1, wherein the positioning member is slidable along the top rod in a first direction through the operating member, so as to be released from lock, or the positioning member is slidable away from the top rod in a second direction perpendicular to the first direction through the operating member, so as to be released from lock.

5. The adjustable mount according to claim 1, wherein the positioning member includes an engaging part and two fixed stands, the two fixed stands are symmetrically clasped and fixed on the top rod, the engaging part is slidably disposed between the two fixed stands, and a plurality of protrusions or a plurality of grooves are disposed on the engaging part.

6. The adjustable mount according to claim 1, wherein the positioning member includes an engaging part and two fixed stands, the two fixed stands are symmetrically clasped and fixed on the top rod, the engaging part is slidably disposed between the two fixed stands, and the second positioning teeth are disposed on the engaging part.

7. The adjustable mount according to claim 6, wherein a slot is disposed on one of the fixed stands to accommodate the elastic member, a window is disposed in the engaging part at a position corresponding to the slot, and the elastic member accommodated in the slot is partly exposed from the window.

8. The adjustable mount according to claim 1, wherein two said top rod adjustment mechanisms are disposed corresponding to the base support of the base.

9. The adjustable mount according to claim 8, wherein the positioning member includes an engaging part and two fixed stands, a slot is disposed on one of the fixed stands to accommodate the elastic member, a window is disposed in the engaging part at a position corresponding to the slot, and the elastic member accommodated in the slot is partly exposed from the window.

10. The adjustable mount according to claim 8, wherein the adjustable mount further comprises a pulling handle, and the pulling handle is connected to the operating member of each of the two top rod adjustment mechanisms.

11. The adjustable mount according to claim 10, wherein the positioning member includes an engaging part and two fixed stands, a slot is disposed on one of the fixed stands to accommodate the elastic member, a window is disposed in the engaging part at a position corresponding to the slot, and the elastic member accommodated in the slot is partly exposed from the window.

12. The adjustable mount according to claim 1, wherein the operating member is formed with an operating member hole, the positioning member and the top rod are accommodated in the operating member hole, and the positioning member is movable in respect to the top rod through the operating member.

13. The adjustable mount according to claim 12, wherein the positioning member includes an engaging part and two fixed stands, a slot is disposed on one of the fixed stands to accommodate the elastic member, a window is disposed in the engaging part at a position corresponding to the slot, and the elastic member accommodated in the slot is partly exposed from the window.

14. An adjustable mount comprising:
a top rod;
a base including a base support, wherein the top rod is pivotally connected to the base support through a top rod pivot shaft; and
a top rod adjustment mechanism including an operating member, a positioning member, and an elastic member, wherein the operating member and the positioning member are connected with each other so that the positioning member is movable in respect to the top rod through the operating member, wherein the positioning member and the base support are positioned by a positioning mechanism, and the elastic member is arranged between the top rod and the positioning member,
wherein the positioning mechanism includes a plurality of grooves disposed on the base support and a plurality of protrusions disposed on the positioning member, or the positioning mechanism includes a plurality of protrusions disposed on the base support and a plurality of grooves disposed on the positioning member,
when operating the operating member, the positioning member slides along the top rod, and
when releasing the operating member, the elastic member pulls the positioning member to move toward the base support.

15. The adjustable mount according to claim 14, wherein the positioning member includes an engaging part and two fixed stands, the two fixed stands are symmetrically clasped and fixed on the top rod, the engaging part is slidably disposed between the two fixed stands, and the plurality of protrusions or the plurality of grooves are disposed on the engaging part.

16. A child safety seat installed in an adjustable amount, wherein the adjustable mount comprises:
a top rod;
a base including a base support, wherein the top rod is pivotally connected to the base support through a top rod pivot shaft;
a top rod adjustment mechanism including an operating member, a positioning member, and an elastic member, wherein the operating member and the positioning member are connected with each other so that the positioning member is movable in respect to the top rod through the operating member, wherein the positioning member and the base support are positioned by a positioning mechanism, and the elastic member is arranged between the top rod and the positioning member; and
a tailstock, wherein the child safety seat has a seat part disposed in a space surrounded by the top rod, the tailstock, and the base, and is fit between the top rod and the tailstock.

* * * * *